United States Patent [19]

Bellomo

[11] Patent Number: 5,282,723
[45] Date of Patent: Feb. 1, 1994

[54] REFRIGERATION COMPRESSOR WITH ELECTRONIC CONTROL ARRANGEMENT

[75] Inventor: Matteo Bellomo, Moncalieri, Italy

[73] Assignee: Zanussi Elettromeccanica S.p.A., Italy

[21] Appl. No.: 802,557

[22] Filed: Dec. 5, 1991

[30] Foreign Application Priority Data

Dec. 11, 1990 [IT] Italy ............... 45776 A/90

[51] Int. Cl.$^5$ ............................. F04B 49/06
[52] U.S. Cl. ......................... 417/45; 62/228.4
[58] Field of Search ............. 62/228.4, 215; 417/45, 417/22

[56] References Cited

U.S. PATENT DOCUMENTS

| | | | |
|---|---|---|---|
| 3,499,297 | 3/1970 | Ruff et al. | 62/228.4 X |
| 4,480,442 | 11/1984 | Ide et al. | 62/228.4 X |
| 4,720,981 | 1/1988 | Helt et al. | 62/228.4 X |
| 5,048,302 | 9/1991 | Hagellocher et al. | 62/228.4 |
| 5,129,234 | 7/1992 | Alford | 62/228.4 X |

FOREIGN PATENT DOCUMENTS 0056647 4/1984 Japan ................ 62/228.4

OTHER PUBLICATIONS

Jordan et al, Refrigeration & Air Conditioning pp. 128 & 129, Prentice Hall, 1948.

*Primary Examiner*—William E. Wayner
*Attorney, Agent, or Firm*—Pearne, Gordon, McCoy & Granger

[57] ABSTRACT

A hermetic reciprocating compressor for refrigerators and freezers, driven by a brushless-type electric motor and provided with a frequency control arrangement to let the motor run at any speed that is compatible with a correct operation of the compressor, achieving an increase in the overall efficiency, a reduction in the operating noise and a reduction in the energy consumption of the compressor. The new compressor design makes it possible to standardize and reduce the number of compressor models which are required to cover a broad application range in refrigeration appliances.

10 Claims, 3 Drawing Sheets

５,282,723

REFRIGERATION COMPRESSOR WITH ELECTRONIC CONTROL ARRANGEMENT

BACKGROUND OF THE INVENTION

This invention generally relates to an improved refrigeration compressor with electronic control arrangement and, in particular to a reciprocating, hermetic-type compressor for domestic refrigerators and freezers.

Currently, this type of compressor is provided with an electric induction motor operating under an on-off type of control at such rotational rates of speed as determined by the existing electric line frequency, i.e. 50 Hz or 60 Hz.

Under these conditions, the refrigerating capacity, given that an equal amount of refrigerant fluid used, is therefore determined mainly by the displacement, i.e. swept volume, of the compressor. Furthermore, it should be noted that, even when adding a running capacitor, the efficiency of an induction motor does not exceed a value of 0.8.

It should also be noted that the penetration rate of combined refrigeration appliances with separate fresh-food and frozen-food compartments served by a single refrigerating circuit with a single compressor is continuously increasing. In view of their ability to cope with the energy demand peaks resulting in connection with the need of freezing the maximum allowable load of food in the corresponding freezing compartment, these appliances must be equipped with a correspondingly rated compressor, i.e. a compressor having a higher power rating than normally required for regular operation, adequately sized to suit the highest energy demand for freezing. Consequently, when the appliance is operating normally in view of only lowering the temperature in the fresh food compartment, the compressor actually turns out to be overrated, i.e. oversized, and uses a considerable amount of energy due to the repeated, frequent cycling of the compressor.

As is widely appreciated, energy savings through the efficiency of household appliances is a primary goal of appliance manufacturers, who have been imposed well-defined energy consumption limits in several countries and are therefore confronted with the need of keeping below these limits.

Finally, a further requirement in connection with all types of appliances intended for home use comes from the need to reduce the operating noise of such appliances as much as possible.

SUMMARY OF THE INVENTION

It is an object of present invention to provide a compressor for refrigerating and freezing appliances which is able to generally eliminate the typical disadvantages and overcome the limitations of current compressors. In particular, the improved compressor with an electronic control arrangement according to this invention can be used in association with any refrigerating circuit, thereby enabling the overall efficiency rating to improve, the noise to be reduced and the energy consumption to be considerably decreased.

The innovatory features of the compressor according to this invention include being provided with an electric drive motor and an electronic control arrangement, wherein the motor is a brushless type motor and the control arrangement is a frequency control arrangement adapted to operate the motor at any speed which is compatible with correct operation of the compressor so as to increase the overall efficiency of the compressor.

BRIEF DESCRIPTION OF THE DRAWINGS

The scope and the advantages of the invention will be further described in the specification with reference to the accompanying drawings, in which.

DETAILED DESCRIPTION OF THE PREFERRED EMBODIMENTS

Figure 1:
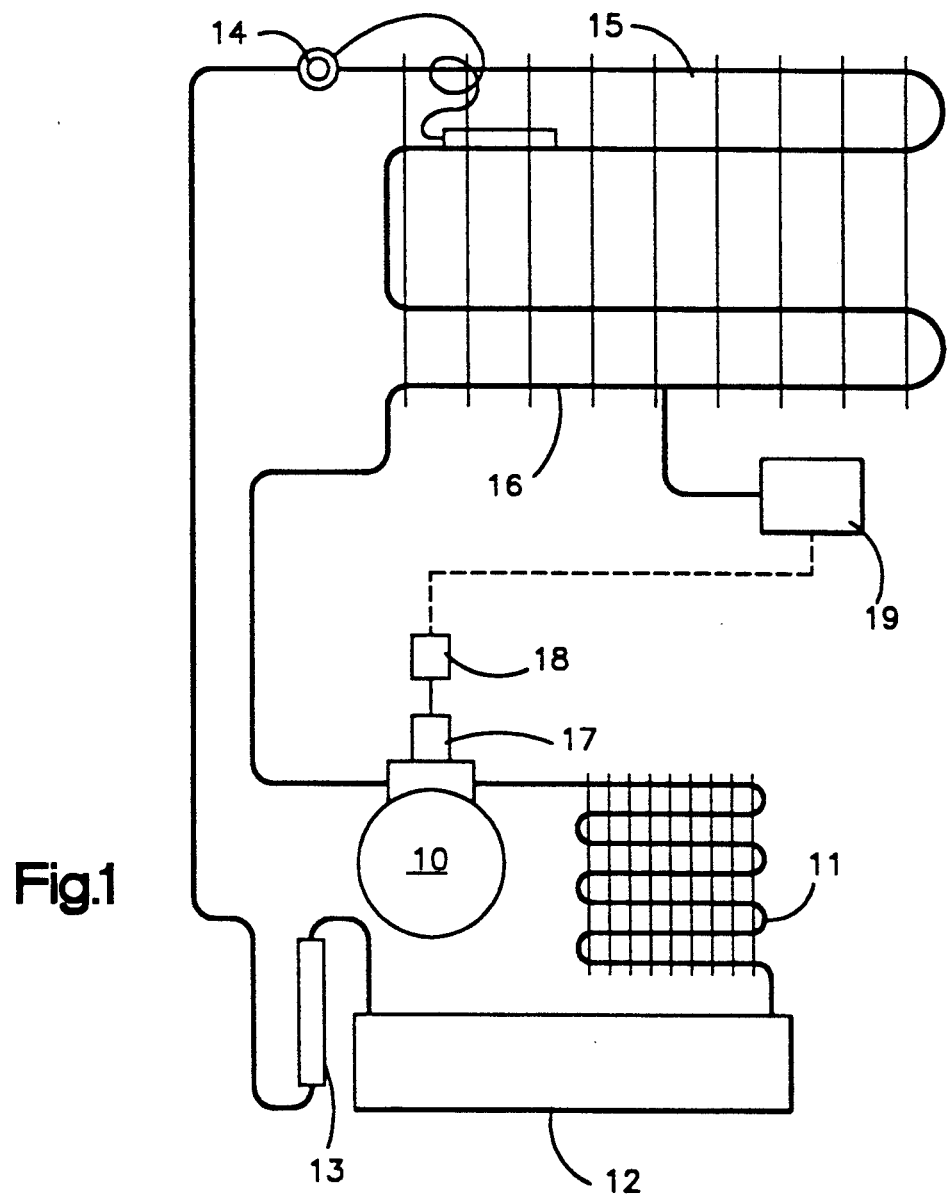
FIG. 1 is a schematic view of a refrigerating circuit provided with a motor-compressor with electronic control arrangement according to the invention.

The refrigerating circuit, which is schematically shown by way of example in FIG. 1 includes a compressor 10, a condenser 11, a collector 12 for the liquid refrigerant fluid, a filter-dehydrator 13, an expansion valve 14, and two evaporators 15 and 16, connected in series, for the frozen-food compartment and the fresh-food compartment, respectively.

According to the invention, the compressor 10 is driven by a motor 17 of the brushless type, which is controlled by a frequency control arrangement 18 of a generally known type.

The frequency control arrangement 18 is connected with a temperature sensor 19, preferably a thermistor, which senses the temperature of the evaporator 16 of the fresh-food compartment. Furthermore, the frequency control arrangement 18 includes; a microprocessor adapted to set, in a preferable way, two different operating frequencies for example a lower frequency corresponding to the highest overall efficiency of the compressor for the operation of the refrigeration appliance under normal refrigeration capacity demand conditions, and a higher frequency for the operation of the appliance under increased refrigeration capacity demand conditions, in particular when the need arises to freeze a considerably large amount of food in the frozen-food compartment constitutes the two different operating frequencies.

Therefore, the invention include the proposal of utilizing, for a compressor of a given refrigerating capacity, a larger displacement and a motor of the brushless type tuned on a lower frequency than the usual 50-Hz or 60-Hz mains frequency, in such a way that the overall compressor efficiency (COP) is increased and the compressor noise is reduced.

In fact, as is known to one skilled in the art, the volumetric efficiency of a compressor improves as its displacement is increased since the relative influence of clearances, dead or passive spaces is decreased. These clearances or dead spaces are formed by, among other things, the volumes of the suction and delivery bores in the valve plates.

A further known fact is the improvement of the volumetric efficiency of a compressor with the decrease of the RPM, i.e. the rotation speed of the motor, since this volumetric efficiency mainly depends on the clearance volume at the top dead center, the heating up of the suction gas, the blow-by losses and the opening and closing lags of the valves. On the other hand, the opening and closing lags of the valves are much less influential at the lower frequencies since they occur at a lesser rate.

Furthermore, it is easy to understand that, by supplying the electric motor driving the compressor with power at a reduced frequency, it will generate less heat and, as a consequence, will transfer a smaller amount of heat to the suction gas.

Finally, the volumetric efficiency can be improved through a reduction in both the clearance or passive volume and the load losses by correspondingly sizing the passage cross-section of the delivery and suction bores in the plate of the valves, while keeping flow rates unaltered.

Additionally, the mechanical efficiency improves as the motor RPM decreases, since it is known that relative losses increase as a function of the motor RPM.

Figure 2:
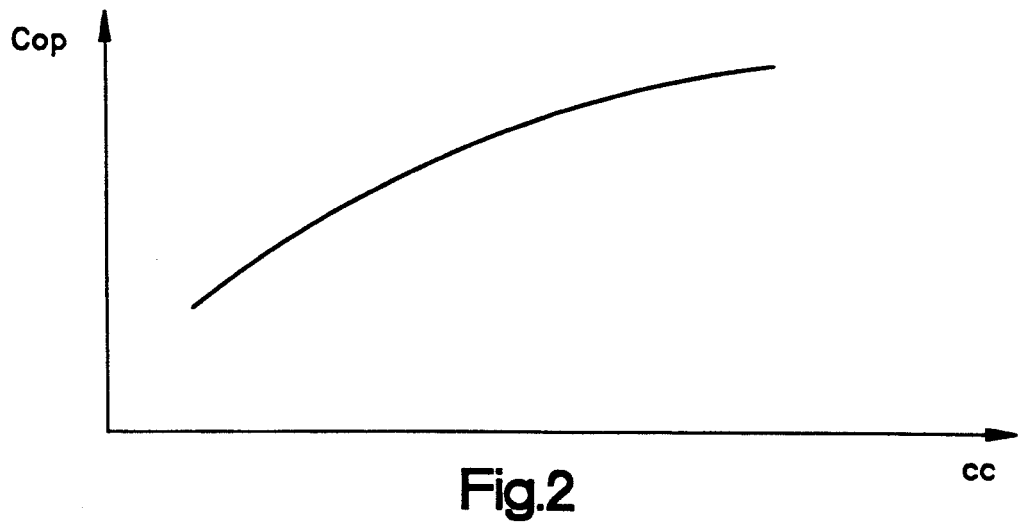
FIGS. 2 through 5 are the views of respective operating diagrams of the motor-compressor with the electronic control arrangement shown in FIG. 1.

FIG. 2 shows the curve relating to the overall efficiency coefficient (COP) of a compressor versus the displacement volume (cc) of the same compressor. Quite similar is, on the other hand, the profile of the curve relating to the overall efficiency coefficient (COP) versus the capacity for a given compressor.

Figure 3:
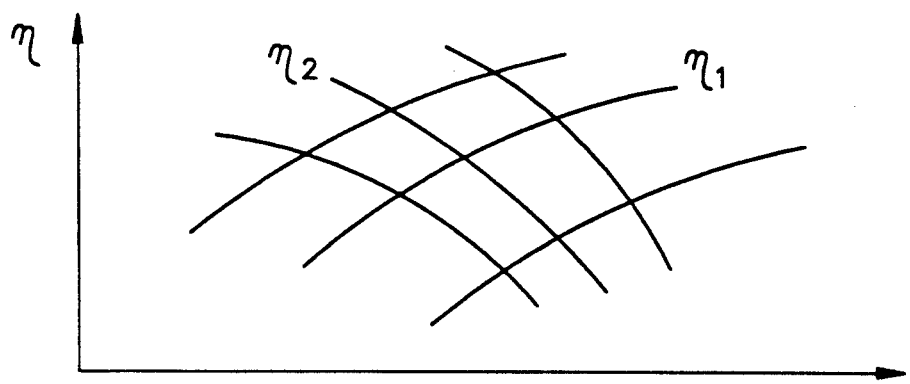

FIG. 3 shows the curves of the volumetric efficiency ($\eta_1$) and the efficiency relating to the load losses through the discharge bore in the valve plate ($\eta_2$) versus the bore diameter ($\phi$), for compressors having different displacement ratings and driven at different motor RPMs.

It is a known fact, and it also ensues from the configuration of the curves shown in the drawings, that the two afore-mentioned types of efficiency have contrasting characteristics, i.e. progress in a contrasting way, so that the optimum sizing of the bore diameter has to be selected in correspondence with the highest value of the product of the two afore-mentioned efficiencies. In particular, this generally occurs at the point at which the two curves relating to the characteristic data (i.e. displacement and RPM) for each compressor meet.

Figure 4:
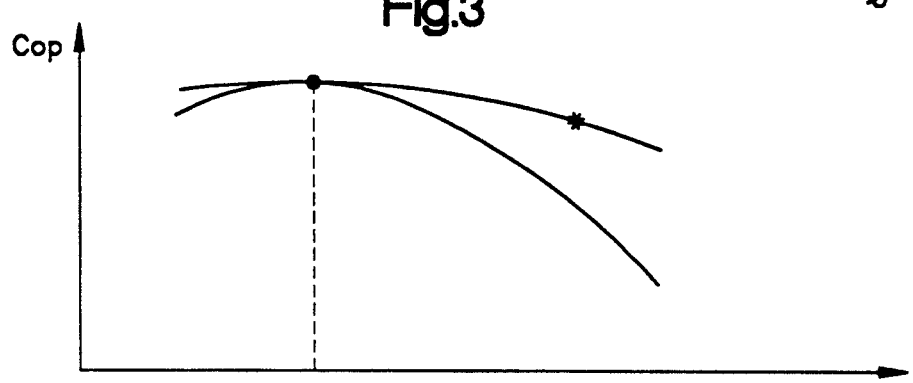

FIG. 4 shows the curve of the overall efficiency coefficient (COP) of a compressor versus the motor RPM, from which it clearly emerges that the efficiency reaches its highest value in correspondence of a well-defined motor RPM.

Figure 5:
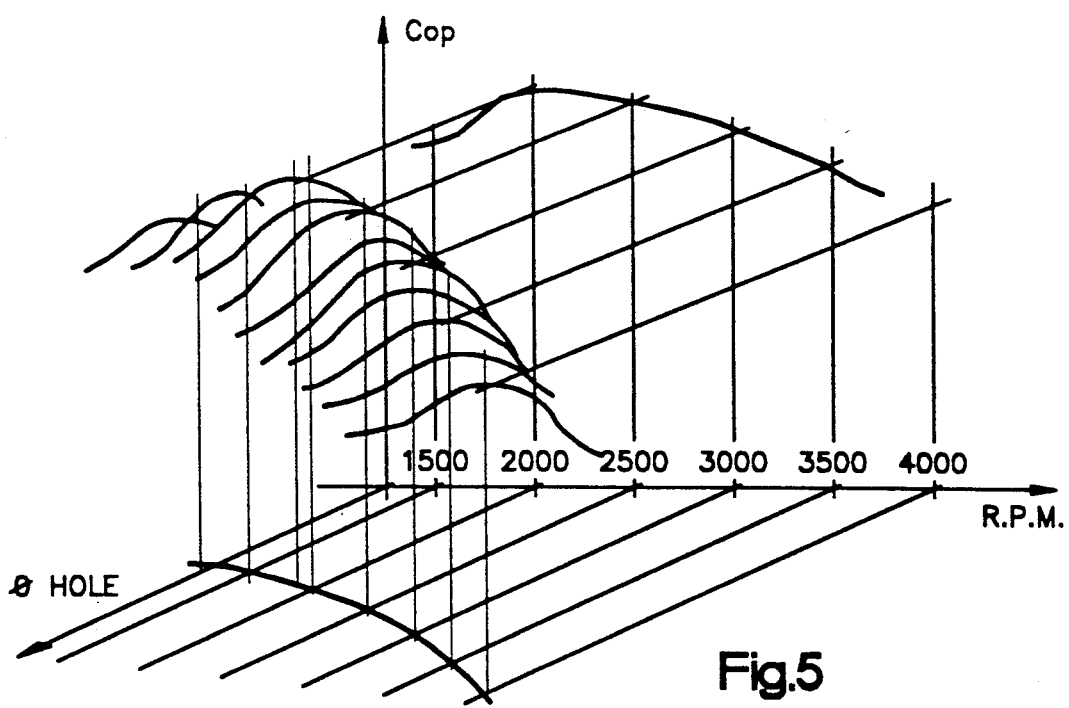

FIG. 5 finally is a three-dimensional diagram showing the curves obtained experimentally in view of optimizing a compressor according to the invention, in order to determine the highest attainable efficiency versus the motor RPM and the diameter of the bore of the discharge or delivery valve.

Figure 6:
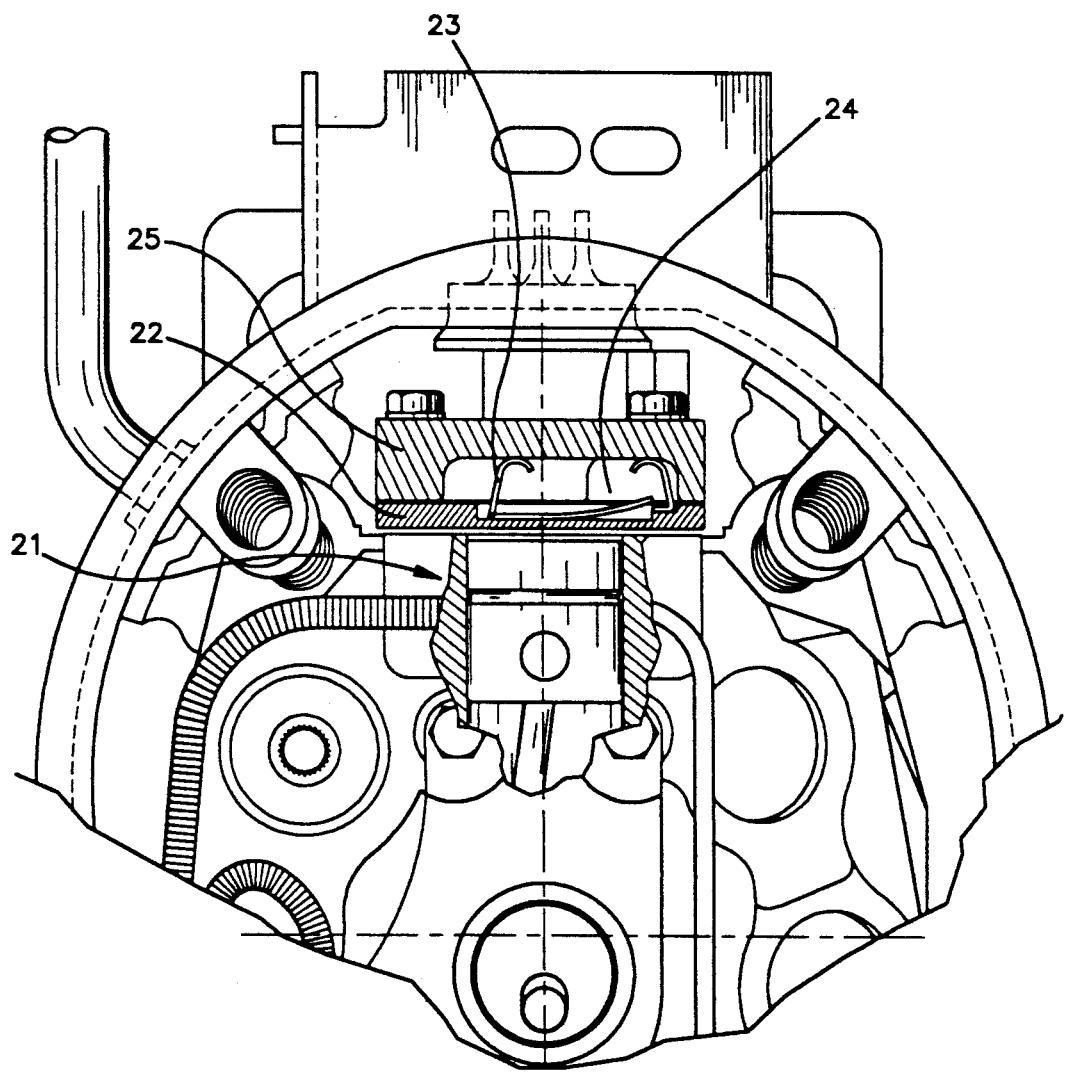
FIG. 6 is a partial schematic cross-sectional view of the cylinder of a modified motor-compressor in view of its utilization according to the invention.

FIG. 6 shows the partial cross-section of a hermetic reciprocating compressor, in which a number of components, i.e. the cylinder-piston assembly 21, the valve plate 22, the valve 23, the delivery or discharge bore 24 and the muffle 25, are illustrated in detail.

From FIG. 5 it clearly ensues that, by using a brushless motor provided with a frequency control arrangement to drive the compressor and modifying in a suitable way the dimensions of the bore of the delivery valve, it is possible to identify the optimum sizing and operating characteristics of the compressor by just moving along the ridge formed by the peak values in the curves shown.

Two examples of optimum sizing of two experimentally designed compressors having different characteristics are illustrated hereinafter.

FIRST EXAMPLE

Let us consider two compressors equipped with induction motors of current production and having different displacement volumes, i.e. a 3.6-cu.cm compressor A and a 3.8-cu.cm compressor B.

Their respective characteristics and performance data are as follows:

| Compressor A: | |
|---|---|
| Motor rotation speed (RPM) | 2875 rpm |
| Refrigerating capacity | 74.8 Kcal/hr |
| Power input rating | 94.5 W |
| COP | 0.92 |
| Compressor B: | |
| Motor rotation speed (RPM) | 2870 rpm |
| Refrigerating capacity | 57.2 Kcal/hr |
| Power input rating | 71.0 W |
| COP | 0.88 |

Now, if we take compressor A and replace its induction motor with a brushless motor, of the variable reluctance type, and, based upon the curves shown in FIG. 5, we further determine the motor RPM at which the compressor modified in the above-described way will be able to deliver a refrigerating capacity which is equal to that delivered by compressor B, the following values will be found:

Compressor A modified according to the invention:

| Motor rotation speed (RPM) | 2100 rpm |
|---|---|
| Refrigerating capacity | 56.0 Kcal/hr |
| Power input rating | 58.0 W |
| COP | 1.12 |

Furthermore, the reduction in the motor RPM (i.e. from 2875 to 2100 rpm) causes the flow rate to decrease accordingly, so that it will be possible and appropriate to downsize the diameter of the bores of the valves.

If we therefore, again based on the curves shown in FIG. 5, identify the COP optimizing diameter of the bore of the delivery valve, it will be found that such a diameter (measuring 3.2 mm in compressor A) can be downsized to just 2.5 mm in the corresponding modified compressor. Through this measure, the COP of this compressor will then increase to 1.15, while the refrigerating capacity will go up to 58 Kcal/hr (which is even a higher capacity than that of compressor B). In other words, what we have achieved in this way is a plain increase of the COP by more than 30 percent.

When repeating this same experiment substituting a brushless permanent-magnet electronically commutated motor for the induction motor, still better results are achieved. As a matter of fact, the COP achieved in this way is as high as 1.25, which means a 42-percent increase over the COP of the original compressor B equipped with standard induction motor.

Even noise measurements give remarkably improved results, since the sound emission level actually decreases from 35.7 db(A) to 34.2 dB(A), while the vibration figure is at the same time slashed from 32.2 dB(A) to 27.0 dB(A).

SECOND EXAMPLE

Let us now take a current-production compressor having a displacement volume of 4.4 cu.cm and driven by an induction motor. Its characteristics are:

| Motor rotation speed (RPM) | 2890 rpm |
|---|---|
| Refrigerating capacity | 88.0 Kcal/hr |
| Power input rating | 99.0 W |
| COP | 1.03 |

If we now use a compressor with a larger displacement volume, i.e. 5.9 cu.cm, driven by a brushless, electronically commutated permanent-magnet motor, the values are achieved:

| Motor rotation speed (RPM) | 2000 rpm |
|---|---|
| Refrigerating capacity | 81.5 Kcal/hr |
| Power input rating | 73.3 W |
| COP | 1.29 |

If at this point also the valve plate undergoes an optimization process in accordance with the lower motor RPM, it ensues that, with delivery and suction bores having a diameter of 2.5 mm each (instead of two bores with a diameter of 3.2 mm each), the refrigerating capacity becomes 86 Kcal/hr (i.e. practically equivalent to the capacity of the unmodified compressor), while the COP jumps to 1.33, an increase of 29.1 percent.

Even the noise figure of the compressor is improved, since it decreases from 38.2 dB(A) to 36.0 dB(A). The same applies to the vibratory behavior since oscillations to fall from 35 dB(A) to 28 dB(A).

It may, therefore, be concluded that the compressor with brushless-type motor with electronic frequency control according to the invention actually achieves the objectives of the invention by enhancing the efficiency, lowering the noise and reducing the energy consumption in a very effective way.

It should also be emphasized how, by using an electronic frequency control employing a microprocessor, it is actually possible to pre-set, for the motor power supply, more than two differently reduced frequencies, without departing from the range of highest overall efficiency of the compressor. Consequently, the compressor according to the invention can be used to equip appliances supplying different refrigerating capacities. This again translates into the further advantage of enabling the number of compressor models, which are required to cover a broad application range in refrigeration appliances, to be standardized and reduced.

It will finally be appreciated that the afore described embodiments of the compressor according to the invention may be the subject of any modifications considered to be appropriate, without departing from the scope of the invention.

I claim:

1. A hermetic reciprocating compressor, in particular for household-type refrigerating and freezing appliances, provided with an electric drive motor (17) and an electronic control arrangement (18), wherein said motor (17) is a brushless-type motor and said control arrangement (18) is a frequency control arrangement adapted to operate said motor at any speed that is compatible with a correct operation of the compressor (10) so as to increase the overall efficiency of the compressor and delivery and suction bores (24) provided in the plate (22) of the valves of the compressor (10) have a diameter which is selected in correspondence of the highest value of the product of volumetric efficiency ($\eta_1$) and load loss efficiency ($\eta_2$) so as to improve the overall efficiency and optimize the refrigerating capacity of the compressor with a reduction in the clearance volume in the compression chamber.

2. A hermetic reciprocating compressor according to claim 1, wherein said frequency control arrangement (18) is adapted to operate the motor at two operating frequencies, the first frequency being lower and corresponding to the highest overall efficiency of the compressor under normal operating conditions of the refrigeration appliance, and the second frequency being higher so as to operate the refrigeration appliance under conditions of a higher refrigerating capacity demand.

3. A hermetic reciprocating compressor according to claim 2, wherein said frequency control arrangement (18) comprises a microprocessor adapted to set one of a plurality of different, reduced frequencies within the range of highest overall efficiency of the compressor.

4. A hermetic reciprocating compressor, in particular for household-type refrigerating and freezing appliances, provided with an electric drive motor (17) and an electronic control arrangement (18), wherein said motor (17) is a brushless-type motor and said control arrangement (18) is a frequency control arrangement adapted to operate said motor at two operating frequencies, the first frequency being lower than the second and corresponding to the highest overall efficiency of the compressor under normal operating conditions of the refrigeration appliance, and the second frequency being higher than the first so as to operate the refrigeration appliance under conditions of a higher refrigerating capacity demand.

5. A hermetic reciprocating compressor according to claim 4, wherein said frequency control arrangement (18) comprises a microprocessor adapted to set one of a plurality of different, reduced frequencies within the range of highest overall efficiency of the compressor.

6. A hermetic reciprocating compressor including valves having a plate with delivery and suction bores, said compressor being provided with an brushless-type electric drive motor and an electronic frequency control arrangement adapted to operate said motor at a reduced operating frequency which is lower than the corresponding frequency of a supply current, a rotational speed of the motor corresponding to the reduced operating frequency, the delivery and suction bores having diameters selected in correspondence of the highest value of the product of volumetric efficiency ($\eta_1$) and load loss efficiency ($\eta_2$), so as to reduce clearance volume in a compression chamber of the compressor, so as to maximize the overall efficiency of the compressor.

7. A hermetic reciprocating compressor according to claim 6, wherein said frequency control arrangement (18) is adapted to operate the motor at two operating frequencies, the first frequency being lower and corresponding to the highest overall efficiency of the compressor under normal operating conditions of the refrigeration appliance, and the second frequency being higher so as to operate the refrigeration appliance under conditions of a higher refrigerating capacity demand.

8. A hermetic reciprocating compressor according to claim 7, wherein said frequency control arrangement (18) comprises a microprocessor adapted to set one of a plurality of different, reduced frequencies within the range of highest overall efficiency of the compressor.

9. A hermetic reciprocating compressor provided with an brushless-type electric drive motor and an electronic/frequency control arrangement adapted to operate said motor at a first reduced operating frequency which is lower than the corresponding frequency of a supply current so as to maximize the overall efficiency of the compressor under normal operating conditions and a second, higher reduced frequency so as to operate the compressor under higher capacity demand with a rotational speed of the motor corresponding to the reduced operating frequency.

10. A hermetic reciprocating compressor according to claim 9, wherein said frequency control arrangement (18) comprises a microprocessor adapted to set one of a plurality of different, reduced frequencies within the range of highest overall efficiency of the compressor.

* * * * *

UNITED STATES PATENT AND TRADEMARK OFFICE
CERTIFICATE OF CORRECTION

PATENT NO. : 5,282,723

DATED : February 1, 1994

INVENTOR(S) : Matteo Bellomo

It is certified that error appears in the above-identified patent and that said Letters Patent is hereby corrected as shown below:

Column 1, line 41, after "through" insert --increasing--; and line 53, after "of" insert --the--.

Column 2, line 23, after "FIG. 1" insert --,-- (comma);

line 37, after "includes" delete ";" (semicolon);

line 39, "frequencies for example" should read --frequencies. For example,--.

line 47, after "compartment" insert --,-- (comma);

line 49, delete "include" and insert --includes--; and line 59, after "spaces" insert --,-- (comma).

UNITED STATES PATENT AND TRADEMARK OFFICE
CERTIFICATE OF CORRECTION

PATENT NO. : 5,282,723

DATED : February 1, 1994

INVENTOR(S) : Matteo Bellomo

It is certified that error appears in the above-identified patent and that said Letters Patent is hereby corrected as shown below:

Column 4, line 23, after "motor," insert --particularly one--.

Column 5, line 29, delete "to";

line 40, after "of" insert --the--; and line 52, after "invention" insert --as defined by the claims appended hereto--.

Signed and Sealed this

Sixth Day of September, 1994

*Attest:*

BRUCE LEHMAN

*Attesting Officer*     *Commissioner of Patents and Trademarks*